United States Patent Office 2,937,105
Patented May 17, 1960

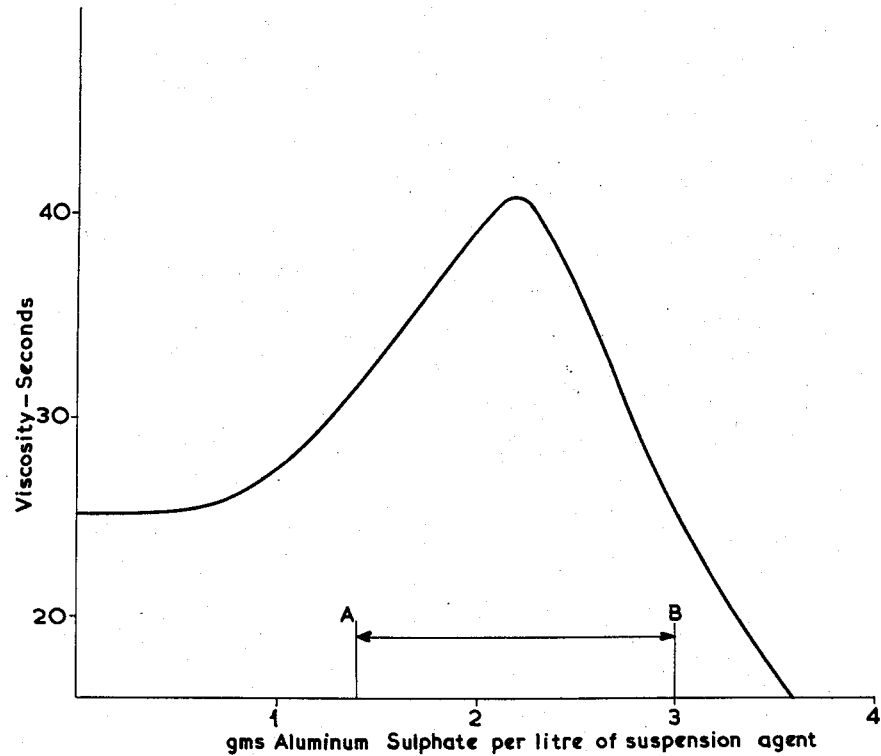

2,937,105

METHOD OF PASTING BY MACHINE

Frits Cazemier and Willem Hendrik Geert Moen, Eindhoven, Netherlands, assignors, by mesne assignments, to North American Philips Company, Inc., New York, N.Y., a corporation of Delaware Application May 24, 1956, Serial No. 587,023

Claims priority, application Netherlands May 25, 1955

3 Claims. (Cl. 106—193)

The invention relates to an adhesive consisting of a suspension of starch in an aqueous liquid, which adhesive is suitable for use in the process of pasting by machine, for example the manufacture of corrugated paper and corrugated paper board by machine.

In the U.S. Patent 2,102,937 adhesives are described consisting of a suspension of starch in a solution of gelatinised starch.

Such suspensions are spread over a paper layer, usually by means of a roll, after which another paper layer is pressed to the first layer, whilst heating the adhesive to a temperature exceeding the gelatinising temperature of the suspended starch grains. This results in gelatinisation with the absorption of water, so that the paper layers are bonded together before the water has evaporated completely or substantially. The adhesives of the kind described have a limitation in that there is a tendency for ungelatinised starch to deposit in pipes and tanks of the apparatus after a shoft period of time.

This phenomenon is promoted in that during movement of the suspension, for example by agitating or circulating the suspension through pipes by means of a pump, the stability of the suspension is reduced, probably because starch is decomposed. Such movement is accompanied by a decrease in the viscosity so that the longer the suspension has been circulated, the less adhesive is transferred to the paper layer. It should be mentioned that the adhesives consisting of a suspension of starch in a solution of gelatinised starch are frequently stabilised by adding a solution of a strong alkali, such as alkali, hydroxyde. However, this method has a limitation in that, although some improvement of the stability of the suspension is usually found, the likelihood of gelatinisation of the adhesive because of its being heated which heat treatment usually is unavoidable, in the tank from which it is transferred to the paper layer, for example by a roll, is increased, and this must be prevented by a rapid circulation of the adhesive. However, this again results in a rapid decrease in viscosity.

Another disadvantage of such a method of stabilisation consists in the fact that the alkaline adhesive discolours the paper which has been in contact with it and that the adhesive may damage some articles which are wrapped in such bonded paper, such as vegetables and fruit.

According to the invention, these disadvantages are obviated by using as a means of suspension for ungelatinised starch a solution of carboxy-methyl cellulose, to which an amount of a solution of an aluminum salt in water has been added, which increases the viscosity of the solution but is insufficient to cause the carboxy-methyl cellulose to flocculate completely. It has been found that, if a small amount of a solution of an aluminum salt in water is added to a solution of carboxy-methyl cellulose, this results in an increased viscosity. When the added amount of the solution of the aluminum salt is increased, the viscosity of this solution increases until a maximum value is attained. When more aluminum salt solution is added, the carboxy-methyl cellulose begins to flocculate, probably in the form of an aluminum salt, which flocculation is considered to be complete when the viscosity value is approximately equal to that of water.

In addition, it has been found that the addition of aluminum salt solution to an aqueous solution of carboxy-methyl cellulose in the above-mentioned ratios always results in a decrease of the tendency for the starch suspended therein to deposit, but also that other substances, such as clay and inorganic powders, are kept suspended therein for a long period of time, particularly when the viscosity has approximately the maximum values which can be attained by the addition of aluminum salt solution.

It was found that, even when this solution is agitated for a long period of time, no perceptible decrease of the viscosity results.

The value of the maximum viscosity, with the addition of aluminum salt solution, depends on the nature of the carboxy-methyl cellulose, more particularly on the molecular weight thereof and on the number of carboxy-methyl groups per molecule and, in addition, on the nature and concentration of the electrolytes in the solution.

With respect to some carboxy-methyl celluloses it could be ascertained that, in a solution which substantially contains no other electrolytes than that which has been added in the form of carboxy-methyl cellulose salt and aluminum salt, the most suitable addition of aluminum salt lies between 0.0002 and 0.007 gram ion of aluminum per gram of dissolved carboxy-methyl cellulose salt. As the aluminum salt we may use any water soluble aluminum salt for example aluminum sulphate, nitrate-chloride, or -acetate.

As the salts of carboxy-methyl cellulose we may use a sodium carboxy-methyl cellulose salt such as is sold under the trade name "H 136." This salt shows a mean value of the number of carboxy methyl-groups in each glucose radical of between 0.56 and 0.66 and a viscosity of between 1000 and 1500 cp. in a 2% solution or we may use any other soluble salt of carboxy methyl cellulose having from 0.3 to 1.3 number of carboxy methyl-groups in a glucose radical and a viscosity of between 100 and 4000 in a 2% solution. The single figure of the accompanying drawing shows a viscosity curve of a solution of carboxy-methyl cellulose in the form of the sodium salt, to which increasing amounts of aluminum sulphate have been added. In the region A—B, starch suspensions were obtained which showed no sedimentation after standing for 2 days.

The experiments are made with the use of carboxy-methyl cellulose salt, which is sold under the trade name H 136. In all the tests the concentration of the carboxy-methyl cellulose was 8 gms. per 800 ccs., which amount was made up to a litre after the addition of a solution of aluminum sulphate. However, the use of other concentrations only slightly affects the shape and situation of the curve. The amount of aluminum sulphate is plotted along the horizontal axis, expressed in gms. of aluminum sulphate per litre of suspension agent.

The viscosities in seconds are plotted along the vertical axis.

These viscosity values are the flow-out times of 100 ccs. of suspension agent heated to 30° C. through an aperture of diameter 2.4 mms. (3/32 inch) in a plate 3.12 mms. (1/8 inch) thick. The hydrostatic pressure of the liquid is made such that water of 20° C. has a flow-out time of 15 seconds.

The stability of the suspension was measured after the addition of 160 gms. of starch, of quality "supra potato flower," to a litre of suspension agent.

For use in a bonding machine for the manufacture of corrugated paper, which required the use of an adhesive having a viscosity of 35 seconds, an adhesive of the composition described hereinbefore was produced, the suspension agent containing 1.75 gms. of aluminum sulphate per litre. However, as an alternative, 2.2 gms. of aluminum sulphate may be added, after which the suspension agent is diluted to obtain the required viscosity.

For the production of a suitable adhesive, preferably 100 to 220 gms. of starch are suspended per litre of suspension agent. If required, for example, in order to impart a higher filling to the adhesive, inert fillers, such as clay and fine inorganic powders, such as ground gypsum and ground chalk, may also be suspended in the suspension agent. In this case, no addition of alkali hydroxide to the adhesive is required.

What is claimed is:

1. An adhesive, particularly adapted, when heated, for the manufacture of corrugated paper by corrugated paper making machines, consisting essentially of an alkali-free aqueous suspension of ungelatinized starch, said starch being present in a major proportion by weight, said suspension containing as the suspension agent a solution of carboxy-methyl cellulose and a water soluble aluminum salt in an amount sufficient to increase the viscosity of the carboxy-methyl cellulose solution but less than that required to flocculate the carboxy-methyl cellulose.

2. An adhesive, particularly adapted, when heated, for the manufacture of corrugated paper by corrugated paper making machines, consisting essentially of an alkali-free aqueous suspension of about 100 gms. to 220 gms. per litre of ungelatinized starch, said starch being present in a major proportion by weight, said suspension containing as the suspension agent a solution of carboxy-methyl cellulose and a water soluble aluminum salt in an amount sufficient to increase the viscosity of the carboxy-methyl cellulose solution but less than that required to flocculate the carboxy-methyl cellulose.

3. The adhesive of claim 2 in which inert fillers are also present.

References Cited in the file of this patent

UNITED STATES PATENTS

| | | |
|---|---|---|
| 2,180,152 | Kohler | Nov. 14, 1939 |
| 2,331,859 | Roberts | Oct. 12, 1943 |
| 2,610,136 | Casey et al. | Sept. 9, 1952 |

FOREIGN PATENTS

| | | |
|---|---|---|
| 894,088 | France | Dec. 13, 1944 |
| 916,221 | Germany | Aug. 5, 1954 |